US010287385B2

(12) United States Patent
Oh et al.

(10) Patent No.: US 10,287,385 B2
(45) Date of Patent: May 14, 2019

(54) WEATHER-RESISTANT THERMOPLASTIC RESIN, THERMOPLASTIC RESIN COMPOSITION CONTAINING THE SAME, AND METHOD OF PREPARING THERMOPLASTIC

(71) Applicant: LG CHEM, LTD., Seoul (KR)

(72) Inventors: Hyun Taek Oh, Daejeon (KR); Yong Yeon Hwang, Daejeon (KR); Min Jung Kim, Daejeon (KR); Chun Ho Park, Daejeon (KR); Sang Mi Lee, Daejeon (KR); Yeong Min Lee, Daejeon (KR); Eun Soo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 35 days.

(21) Appl. No.: 15/531,406

(22) PCT Filed: Oct. 6, 2016

(86) PCT No.: PCT/KR2016/011164
§ 371 (c)(1),
(2) Date: May 26, 2017

(87) PCT Pub. No.: WO2017/061777
PCT Pub. Date: Apr. 13, 2017

(65) Prior Publication Data
US 2017/0349688 A1 Dec. 7, 2017

(30) Foreign Application Priority Data

Oct. 7, 2015 (KR) ........................ 10-2015-0140690

(51) Int. Cl.
C08L 25/14 (2006.01)
C08F 257/02 (2006.01)
C08J 3/00 (2006.01)
C08F 20/06 (2006.01)
C08L 51/06 (2006.01)
C08J 3/12 (2006.01)
C08L 33/06 (2006.01)

(52) U.S. Cl.
CPC ............ *C08F 257/02* (2013.01); *C08F 20/06* (2013.01); *C08J 3/005* (2013.01); *C08J 3/12* (2013.01); *C08L 25/14* (2013.01); *C08L 33/06* (2013.01); *C08L 51/06* (2013.01); *C08J 2325/14* (2013.01); *C08J 2451/00* (2013.01); *C08L 2207/53* (2013.01)

(58) Field of Classification Search
CPC .......................... C08F 257/02; C08L 2207/53
See application file for complete search history.

(56) References Cited

U.S. PATENT DOCUMENTS

| 4,224,419 A | 9/1980 | Swoboda et al. |
| 4,393,172 A | 7/1983 | Lindner et al. |
| 4,912,162 A | 3/1990 | Kishida et al. |
| 5,777,036 A | 7/1998 | Fischer et al. |
| 5,932,655 A | 8/1999 | Auclair et al. |
| 6,720,386 B2 | 4/2004 | Gaggar et al. |
| 2003/0236350 A1 | 12/2003 | Berzinis et al. |
| 2006/0069208 A1 | 3/2006 | Dhawan et al. |
| 2007/0014977 A1* | 1/2007 | Graney ................. B32B 9/02 428/212 |
| 2007/0287799 A1 | 12/2007 | Ha et al. |
| 2008/0096143 A1* | 4/2008 | Quintens ............... B29C 55/06 430/496 |
| 2008/0128928 A1* | 6/2008 | Cojocariu .............. C08J 5/18 264/1.6 |
| 2008/0286326 A1* | 11/2008 | Benco ................... A61L 27/34 424/423 |

(Continued)

FOREIGN PATENT DOCUMENTS

| CN | 101336255 A | 12/2008 |
| CN | 101506300 A | 8/2009 |
| CN | 103764700 A | 4/2014 |
| CN | 104072926 A | 10/2014 |
| DE | 1 260 135 B | 2/1968 |
| EP | 0 534 212 A1 | 3/1993 |
| EP | 0 904 305 B1 | 3/1999 |
| EP | 2759570 A1 | 7/2014 |
| JP | S59-049245 A | 3/1984 |
| JP | H03-066329 A | 3/1991 |
| KR | 10-2001-0109792 A | 12/2001 |

(Continued)

OTHER PUBLICATIONS

International Search Report for PCT/KR2016/011164 filed on Oct. 6, 2017.

(Continued)

*Primary Examiner* — Jeffrey C Mullis

(57) ABSTRACT

The present invention relates to a weather-resistant thermoplastic resin, a thermoplastic resin composition containing the same, and a method of preparing the thermoplastic resin composition. More particular, the present invention relates to a thermoplastic resin including a) a hard core having a refractive index of 1.530 to 1.590; b) a crosslinked rubber layer that surrounds the hard core, has an average thickness of 30 to 80 nm, and is prepared by polymerizing an alkyl (meth)acrylate compound and a crosslinking agent; and c) a non-crosslinked hard shell that surrounds the crosslinked rubber layer and is prepared by polymerizing an aromatic vinyl compound and a vinyl cyanide compound, a thermoplastic resin composition including the thermoplastic resin, and a method of preparing the thermoplastic resin composition. In accordance to the present disclosure, a weather-resistant thermoplastic resin having superior rigidity and impact resistance, particularly excellent surface gloss and coloring properties, a thermoplastic resin composition containing the same, and a method of preparing the thermoplastic resin composition may be provided.

20 Claims, No Drawings

(56) References Cited

U.S. PATENT DOCUMENTS

2014/0235749 A1* 8/2014 Kim ..................... C08F 291/12
                                                            523/122

FOREIGN PATENT DOCUMENTS

| KR | 10-2007-0019300 A | 2/2007 |
| KR | 10-2008-0038589 A | 5/2008 |
| KR | 10-2013-0078379 A | 7/2013 |
| KR | 10-2014-0027872 A | 3/2014 |

OTHER PUBLICATIONS

Office Action from Chinese Patent Office for Application No. 201680003828.X, dated Nov. 5, 2018.

* cited by examiner

WEATHER-RESISTANT THERMOPLASTIC RESIN, THERMOPLASTIC RESIN COMPOSITION CONTAINING THE SAME, AND METHOD OF PREPARING THERMOPLASTIC

CROSS-REFERENCE TO RELATED APPLICATION

This application is a U.S. National Stage of PCT/KR2016/011164 filed Oct. 6, 2016, which claims the priority benefit of Korean Patent Application No. 10-2015-0140690, filed on Oct. 7, 2015 in the Korean Intellectual Property Office, the disclosure of which is incorporated herein by reference in its entirety.

TECHNICAL FIELD

The present invention relates to a weather-resistant thermoplastic resin, a thermoplastic resin composition containing the same, and a method of preparing the thermoplastic resin composition, and more particularly to a weather-resistant thermoplastic resin having superior rigidity and impact resistance, particularly excellent surface gloss and coloring properties, a thermoplastic resin composition containing the same, and a method of preparing the thermoplastic resin composition.

BACKGROUND ART

ABS resin is an acrylonitrile-butadiene-styrene terpolymer and has excellent impact resistance, rigidity, chemical resistance, and processability, and thus is used for various purposes in various fields such as electronics, construction, and automobiles. However, since ABS resin is prepared using a butadiene rubber polymer, ABS resin has a low weatherability and is not suitable as an outdoor material.

Therefore, to prepare a thermoplastic resin having excellent physical properties, weatherability, and aging resistance, ethylene-based unsaturated polymers associated with aging caused by ultraviolet light should not be present in graft copolymers. As such a resin, acrylonitrile-styrene-acrylate (ASA) resins using crosslinked alkyl acrylate rubber polymers are typical. These ASA resins have excellent weatherability and aging resistance and are used in various fields such as automobiles, ships, leisure goods, building materials, and gardening.

A method of preparing an ASA polymer having weatherability and aging resistance was disclosed in German Patent No. 1,260,135, and a core rubber used in the patent is a crosslinked large-diameter acrylate rubber latex having an average particle diameter of 150 to 800 nm and a narrow particle size distribution. This ASA polymer has improved notched impact strength, but is difficult to color, as compared with an ASA polymer prepared using a small-diameter polyacrylate latex. The difficulty in coloring results in a faded pastel color rather than a bright color, and thus the use thereof is limited in preparation of a colored molded article having high saturation.

U.S. Pat. Nos. 4,224,419 and 5,932,655 and European Patent No. 534,212 disclose a molding material using a mixture of a first graft copolymer containing a crosslinked alkyl acrylate rubber polymer having a small average particle diameter and a second graft copolymer containing a crosslinked alkyl acrylate polymer having a large average rubber particle diameter. This molding material has excellent weatherability and mechanical properties and improved coloring properties. However, since the refractive index of the crosslinked alkyl acrylate polymer contained in the molding material is very different from the refractive index of a grafted styrene-acrylonitrile copolymer, a lot of light scattering occurs and a clear color may not be realized when the molding material is colored.

To overcome these drawbacks, Japanese Unexamined Patent Application Publication Nos. 47-47863 and 59-49245, Japanese Patent Laid-Open Publication No. 3-66329, U.S. Pat. Nos. 4,912,162 and 4,393,172 and the like disclose a method of incorporating a diene-based rubber polymer inside an alkyl acrylate rubber polymer. However, this method has a limitation in preparing a resin having high weatherability because a diene-based polymer is introduced.

In addition, a method of introducing monomers that increase the refractive index of a polymer at the stage of preparing an alkyl acrylate polymer rubber is disclosed in U.S. Pat. No. 5,777,036 and U.S. Patent Publication No. 2007/0287799 and European Patent No. 904,305. However, this method has a limitation in selection of monomers and has a disadvantage that preparation cost is greatly increased.

To solve these problems, U.S. Pat. No. 6,720,386 and U.S. Patent Publication Nos. 2003/0236350 and 2006/0069208 disclose a terpolymer of alkyl methacrylate-aromatic vinyl compound-vinyl cyanide compound as a hard thermoplastic resin forming a matrix phase and an alkyl methacrylate polymer, and a method of lowering the refractive index of a matrix phase by using the same alone or in combination thereof. However, a weather-resistant resin prepared by the above-described method still has insufficient light transmittance and therefore is not satisfactory in coloring properties. Further, no method of improving the yield of the weather-resistant resin is described in the above method.

DISCLOSURE

Technical Problem

Therefore, the present invention has been made in view of the above problems, and it is one object of the present invention to provide a weather-resistant thermoplastic resin having superior rigidity and impact resistance, particularly excellent surface gloss and coloring properties, a thermoplastic resin composition containing the same, and a method of preparing the thermoplastic resin composition.

The above object and other objects of the present invention can be achieved by the following description.

Technical Solution

In accordance with one aspect of the present invention, provided is a thermoplastic resin, including: a) a hard core having a refractive index of 1.530 to 1.590; b) a crosslinked rubber layer that surrounds the hard core, has an average thickness of 30 to 80 nm, and is prepared by polymerizing an alkyl (meth)acrylate compound and a crosslinking agent; and c) a non-crosslinked hard shell that surrounds the crosslinked rubber layer and is prepared by polymerizing an aromatic vinyl compound and a vinyl cyanide compound.

The thermoplastic resin may include, for example, a) 5 to 40% by weight of the hard core having a refractive index of 1.530 to 1.590; b) 20 to 60% by weight of the crosslinked rubber layer that surrounds the hard core, has an average thickness of 30 to 80 nm, and is prepared by polymerizing an alkyl (meth)acrylate compound and a crosslinking agent; and c) 20 to 60% by weight of the non-crosslinked hard shell that surrounds the rubber layer and is prepared by polymerizing an aromatic vinyl compound and a vinyl cyanide compound.

The hard core of a) may be, for example, a crosslinked polymer having a glass transition temperature (Tg) of 20° C. or higher.

The hard core of a) may be, for example, a copolymer that is prepared by polymerizing an aromatic vinyl compound and a vinyl cyanide compound with a crosslinking agent, or a crosslinking agent and a grafting agent.

The crosslinked rubber layer of b) may be, for example, a crosslinked rubber layer that is prepared by polymerizing an alkyl (meth)acrylate compound, a crosslinking agent, and a grafting agent.

The crosslinked rubber layer of b) may have a glass transition temperature (Tg) of, for example, −70 to −20° C.

The alkyl (meth)acrylate compound of b) may be, for example, one or more selected from the group consisting of methyl acrylate, ethyl acrylate, butyl acrylate, ethylhexyl acrylate, butyl methacrylate, and ethylhexyl methacrylate.

The crosslinking agent of b) may be, for example, one or more selected from the group consisting of ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylol propane trimethacrylate, and trimethylol methane triacrylate.

The crosslinking agent of a) may be included in an amount of, for example, 0.01 to 0.5 parts by weight with respect to 100 parts by weight of total monomers used in the thermoplastic resin.

The crosslinking agent of b) may be included in an amount of, for example, 0.1 to 1.0 parts by weight with respect to 100 parts by weight of total monomers used in the thermoplastic resin.

The grafting agents of a) and b) may be, for example, one or more selected from the group consisting of allyl methacrylate (AMA), triallyl isocyanurate (TRIC), triallylamine (TAA), and diallylamine (DAA).

The grafting agent of a) may be included in an amount of, for example, 0.01 to 0.5 parts by weight with respect to 100 parts by weight of total monomers used in the thermoplastic resin.

The grafting agent of b) may be included in an amount of, for example, 0.1 to 1.0 parts by weight with respect to 100 parts by weight of total monomers used in the thermoplastic resin.

The thermoplastic resin may have an average particle diameter of, for example, 150 to 550 nm.

In accordance with another aspect of the present invention, provided is a thermoplastic resin composition including: A) 20 to 80% by weight of a thermoplastic resin including a) a hard core having a refractive index of 1.530 to 1.590, b) a crosslinked rubber layer that surrounds the hard core, has an average thickness of 30 to nm, and is prepared by polymerizing an alkyl (meth)acrylate compound and a crosslinking agent, and c) a non-crosslinked hard shell that surrounds the crosslinked rubber layer and is prepared by polymerizing an aromatic vinyl compound and a vinyl cyanide compound; and B) 20 to 80% by weight of a hard thermoplastic resin having a refractive index of 1.52 to 1.56.

The hard thermoplastic resin of B) may have a glass transition temperature (Tg) of, for example, 60 to 140° C.

The hard thermoplastic resin of B) may have a weight average molecular weight of, for example, 50,000 to 500,000 g/mol.

The hard thermoplastic resin of B) may be, for example, a polymer that is prepared by polymerizing one or more selected from the group consisting of an aromatic vinyl compound, a vinyl cyanide compound, and an alkyl (meth)acrylate.

The thermoplastic resin composition may have a light transmittance of, for example, 35% or more.

In accordance with another aspect of the present invention, provided is a method of preparing a thermoplastic resin composition, the method including a step of melt-kneading and extruding: A) 20 to 80% by weight of a thermoplastic resin including a) a hard core having a refractive index of 1.530 to 1.590, b) a crosslinked rubber layer that surrounds the hard core, has an average thickness of 30 to 80 nm, and is prepared by polymerizing an alkyl (meth)acrylate compound and a crosslinking agent, and c) a non-crosslinked hard shell that surrounds the rubber layer and is prepared by polymerizing an aromatic vinyl compound and a vinyl cyanide compound; and B) 20 to 80% by weight of a hard thermoplastic resin having a refractive index of 1.52 to 1.56.

Advantageous Effects

As apparent from the fore-going, the present invention advantageously provides a weather-resistant thermoplastic resin exhibiting excellent surface gloss, impact resistance, and tensile strength with excellent coloring properties due to superior light transmittance, a thermoplastic resin composition containing the same, and a method of preparing the thermoplastic resin composition.

BEST MODE

Hereinafter, a weather-resistant thermoplastic resin, a thermoplastic resin composition containing the same, and a method of preparing the thermoplastic resin composition, according to the present disclosure, are described in detail.

The present writers have researched a weather-resistant resin composition that is capable of exhibiting excellent coloring properties and superior surface gloss, rigidity, and impact resistance by improving light transmittance of a weather-resistant styrene-based thermoplastic resin such as a conventional ASA resin. As a result, the present writers confirmed that, when a hard polymer or copolymer having a refractive index of 1.530 to 1.590 is introduced into a core, a graft copolymer forming a dispersed rubber phase is prepared by sequentially graft-copolymerizing a rubber layer, a main ingredient of which is a crosslinked alkyl (meth)acrylate polymer and which has a thickness of 30 nm to 80 nm; and a non-crosslinked polymer shell, which is formed of an aromatic vinyl compound and a vinyl cyanide compound, and the prepared graft copolymer is melt-mixed with a hard thermoplastic resin that has a refractive index of 1.52 to 1.56 and a weight average molecular weight of 50,000 to 500,000 and forms a matrix, a prepared thermoplastic resin composition exhibits remarkably increased light transmittance and superior surface gloss, rigidity, and impact resistance, thus completing the present disclosure.

The thermoplastic resin of the present disclosure includes a) a hard core having a refractive index of 1.530 to 1.590; b) a crosslinked rubber layer that surrounds the hard core, has an average thickness of 30 to 80 nm, and is prepared by polymerizing an alkyl (meth)acrylate compound and a crosslinking agent; and c) a non-crosslinked hard shell that surrounds the crosslinked rubber layer and is prepared by polymerizing an aromatic vinyl compound and a vinyl cyanide compound.

<Preparation of Thermoplastic Resin (A)>

The thermoplastic resin (A) of the present disclosure is a graft copolymer with a multilayered structure formed by sequentially polymerizing a core ingredient (a) with a refractive index of 1.53 to 1.59, a crosslinked rubber ingredient (b) with a thickness of 30 nm to 80 nm, and a non-crosslinked hard ingredient (c). Here, since the thickness of the crosslinked rubber ingredient (b) is much smaller than the wavelength range of light, light scattering is minimized and light transmittance is improved. At the same time, the core ingredient (a) and the crosslinked rubber ingredient (b) together form a dispersed rubber phase in a final product and thus, although the thickness of the rubber layer (b) is very thin, the size of a dispersed rubber phase (the hard core (a)+the crosslinked rubber layer (b)) increases. Accordingly, impact resistance may be exhibited similarly to the case that large-diameter rubber particles are dispersed.

Preparation of Hard Core (a)

The hard core (a) of the present disclosure may be prepared by, for example, polymerizing 5 to 40 parts by weight of a monomer for formation of the hard core (a), 0.05 to 0.5 parts by weight of a crosslinking agent, 0.05 to 0.5 parts by weight of a grafting agent, 0 to 2 parts by weight of an emulsifier, 0.05 to 2.5 parts by weight of a polymerization initiator, 0.01 to 1.0 parts by weight of an electrolyte, and a proper amount of distilled water based on 100 parts by weight of a total of monomers used for preparation of the thermoplastic resin (A).

The amount of the distilled water is not specifically limited, and may be used in an amount of, for example, 10 to 150 parts by weight, or 20 to 100 parts by weight.

The monomer for formation of the hard core (a) is not specifically limited so long as the monomer is capable of forming a hard polymer. For example, the monomer is preferably one or more selected from the group consisting of an aromatic vinyl compound, a vinyl cyanide compound, and alkyl (meth)acrylate. In this case, excellent coloring properties and surface gloss are exhibited and superior mechanical properties are provided.

For example, a polymer forming the hard core (a) includes preferably 50 to 90 parts by weight of an aromatic vinyl compound, 2 to 30 parts by weight of a vinyl cyanide compound, and 0 to 30 parts by weight of an alkyl (meth) acrylate based on 100 parts by weight of a total of monomers used for preparation of the hard core (a). Within this range, excellent coloring properties and surface gloss are exhibited and superior mechanical properties are provided.

The hard core of the present disclosure may have a glass transition temperature of room temperature or more. For example, the hard core may be a polymer core having a glass transition temperature of 20° C. or more.

In another embodiment, the monomer for formation of the hard core (a) is preferably used in an amount of 5 to 40 parts by weight, 10 to 30 parts by weight, or 15 to 25 parts by weight based on 100 parts by weight of a total of monomers used for preparation of the thermoplastic resin (A). Within this range, superior coloring properties and impact strength are provided.

The crosslinking agent may be, for example, ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylol propane trimethacrylate, or trimethylolethane triacrylate or a mixture of two or more thereof.

In an embodiment, the crosslinking agent is preferably used in an amount of, for example, 0.01 to 0.5 parts by weight of, or 0.04 to 0.5 parts by weight based on 100 parts by weight of a total of monomers used for preparation of the thermoplastic resin (A). Within this range, superior mechanical properties, such as surface gloss and impact strength, are provided.

The grafting agent may be, for example, allyl methacrylate (AMA), triallyl isocyanurate (TAIC), triallylamine (TAA), or diallylamine (DAA) or a mixture of two or more thereof.

In an embodiment, the grafting agent is preferably used in an amount of, for example, 0.01 to 0.5 parts by weight of, or 0.04 to 0.5 parts by weight based on 100 parts by weight of a total of monomers used for preparation of the thermoplastic resin (A). Within this range, appearance properties of a final product, such as surface gloss, and mechanical properties, such as impact strength, are superior.

In the present disclosure, the crosslinking agent and the grafting agent are used separately from the monomers.

Examples of the polymerization initiator are not specifically limited, and, for example, a peroxide, an azo-based initiator, or a redox-based polymerization initiator prepared by combining an oxidizing agent and reducing agent is preferred.

Examples of the emulsifier are not specifically limited, and, for example, an alkylsulfosuccinate metal salt having 12 to 18 carbon atoms, a derivative thereof, an alkylsulfuric acid ester metal salt having 12 to 20 carbon atoms, a derivative thereof, an alkylsulfonic acid metal salt having 12 to 20 carbon atoms, a derivative thereof, fatty acid soap, rosin acid soap, or the like or a mixture of two or more thereof, which enables superior latex stability during emulsion polymerization and increase a polymerization rate, may be used. In particular, the alkylsulfosuccinate metal salt having 12 to 18 carbon atoms may be dicyclohexyl sulfosuccinate, dihexyl sulfosuccinate, di-2-ethyl hexyl sulfosuccinate sodium salt, di-2-ethyl hexyl sulfosuccinate potassium salt, sodium dioctyl sulfosuccinate, dioctyl sulfosuccinate potassium salt, or the like; the alkylsulfuric acid ester metal salt or alkylsulfonic acid metal salt having 12 to 20 carbon atoms may be sodium laurel sulfate, sodium dodecyl sulfate, sodium dodecylbenzene sulfate, sodium octadecyl sulfate, sodium oleic sulfate, potassium dodecyl sulfate, potassium octadecyl sulfate, or the like; examples of the fatty acid soap include oleic acid, stearic acid, lauric acid, sodium of mixed fatty acids, potassium salt, and the like; and examples of the rosin acid soap include abietic acid salt and the like.

In the present disclosure, a derivative of a compound refers to a compound formed by substituting one or more hydrogens or functional groups of the compound with other organic or inorganic groups.

Examples of the electrolyte include, for example, KCl, NaCl, $KHCO_3$, $NaHCO_3$, $K_2CO_3$, $Na_2CO_3$, $KHSO_3$, $NaHSO_3$, $K_4P_2O_7$, $K_3PO_4$, $Na_3PO_4$, $K_2HPO_4$, $Na_2PO_4$, or the like or a mixture of two or more thereof.

The hard core (a) may be prepared, for example, through emulsion polymerization or soap-free emulsion polymerization. For example, the emulsion polymerization or the soap-free emulsion polymerization may be carried out by, after substituting the inside of a reactor with nitrogen three times, adding a monomer for formation of the hard core (a), an emulsifier, an electrolyte, and distilled water together to the reactor, and then adding a polymerization initiator thereto, so as to initiate reaction, while maintaining an internal temperature of the reactor at 40 to 85° C.

The glass transition temperature of the hard core (a) may be, for example, 20° C. or more, 20 to 140° C., or to 140°

C. Within this range, mechanical properties, such as surface gloss and impact strength, are superior.

The average particle diameter of the hard core (a) may be, for example, 100 to 250 nm, or 150 to 200 nm. Within this range, mechanical properties, such as surface gloss and impact strength, are superior.

Preparation of Crosslinked Rubber Layer (b)

The crosslinked rubber layer (b) of the present disclosure may be, for example, a crosslinked alkyl acrylate rubber polymer, and may be prepared by simultaneously adding 20 to 70 parts by weight of an alkyl acrylate monomer, 0.1 to 1.0 parts by weight of a crosslinking agent, 0.1 to 1.0 parts by weight of a grafting agent, 0.1 to 2.5 parts by weight of an emulsifier, 0.01 to 2 parts by weight of a polymerization initiator, and a proper amount of distilled water or continuously adding the same over 1 to 7 hours, in the presence of the hard core latex (a), based on 100 parts by weight of a total of monomers used for preparation of the thermoplastic resin (A), and maintaining reaction temperature at 30 to 85° C. such that emulsion polymerization occurs.

The amount of the distilled water is not specifically limited, and may be, for example, 5 to 100 parts by weight, or 10 to 50 parts by weight.

The polymerization initiator may be, for example, one or more of the polymerization initiators which may be used in the step of preparing the hard core (a).

As the emulsifier, for example, an alkylsulfosuccinate metal salt having a pH of 3 to 9 and to 18 carbon atoms, a derivative thereof, an alkylsulfuric acid ester metal salt having 12 to 20 carbon atoms, a derivative thereof, an alkylsulfonic acid metal salt having 12 to 20 carbon atoms, or a derivative or a mixture of two or more thereof may be used. In particular, as the alkylsulfosuccinate metal salt having 12 to 18 carbon atoms, dicyclohexyl sulfosuccinate sodium salt, dihexyl sulfosuccinate sodium salt, di-2-ethylhexyl sulfosuccinate sodium salt, di-2-ethylhexyl sulfosuccinate potassium salt, dioctyl sulfosuccinate sodium salt, or dioctyl sulfosuccinate potassium salt or the like; and the alkylsulfuric acid ester metal salt or alkylsulfonic acid metal salt having 12 to 20 carbon atoms may be sodium laurel sulfate, sodium dodecyl sulfate, sodium dodecylbenzene sulfate, sodium octadecyl sulfate, sodium oleic sulfate, potassium dodecyl sulfate, potassium octadecyl sulfate, or the like. These substances may be used alone or as a mixture of two or more thereof.

The crosslinking agent, for example, may be one or more selected from the crosslinking agents which may be used for preparation of the hard core (a).

For example, the crosslinking agent is preferably used in an amount of 0.1 to 1.0 parts by weight of, or 0.1 to 0.5 parts by weight based on 100 parts by weight of a total of monomers used for preparation of the thermoplastic resin (A). Within this range, mechanical properties, such as surface gloss and impact strength, are superior.

The grafting agent may be, for example, one or more selected from the grafting agents which may be used for preparation of the hard core (a).

The grafting agent is preferably used in an amount of, for example, 0.1 to 1.0 parts by weight or 0.1 to 0.5 parts by weight based on 100 parts by weight of a total of monomers used for preparation of the thermoplastic resin (A). Within this range, mechanical properties, such as surface gloss, coloring properties, and impact strength, are superior.

The crosslinked rubber layer (b) of the thermoplastic resin (A) may be, for example, a crosslinked alkyl (meth)acrylate rubber polymer having a glass transition temperature of −70° C. to −20° C., or −50° C. to −25° C. Here, the glass transition temperature may be measured using a DSC method.

An alkyl (meth)acrylate monomer of the crosslinked rubber layer (b) of the thermoplastic resin (A) is preferably an alkyl(meth)acrylate with an alkyl chain length of 2 to 8 carbon atoms, preferably 4 to 8 carbon atoms, are present. More preferably, the alkyl (meth)acrylate monomer is butyl acrylate, ethylhexyl acrylate, butyl methacrylate, or ethylhexyl methacrylate.

For example, the monomer constituting the crosslinked rubber layer (b) is used in an amount of, preferably, 30 to 55 parts by weight, or 35 to 50 parts by weight based on 100 parts by weight of a total of monomers used for preparation of the thermoplastic resin (A). Within this range, both coloring properties and impact strength are superior.

The crosslinked rubber layer (b) may have a thickness of, for example, 30 to 70 nm, 30 to 60 nm, or 35 to 60 nm. Within this range, both coloring properties and impact strength are superior.

Preparation of Non-crosslinked Hard Shell (c)

The non-crosslinked hard shell (c) of the present disclosure is, for example, an aromatic vinyl compound-vinyl cyanide compound copolymer. The aromatic vinyl compound-vinyl cyanide compound copolymer may be prepared by simultaneously adding 5 to 30 parts by weight of an aromatic vinyl compound, 2 to 25 parts by weight of a vinyl cyanide compound, 0.5 to 3 parts by weight of an emulsifier, 0.05 to 2 parts by weight of a polymerization initiator, 0.02 to 2 parts by weight of a molecular weight regulator, and a proper amount of distilled water, in the presence of latex prepared by graft-polymerizing the hard core (a) with the crosslinked rubber layer (b), based on 100 parts by weight of a total of monomers used for preparation of the thermoplastic resin (A), or continuously adding the same over two to seven hours, followed by emulsion graft polymerization at 50 to 85° C.

The non-crosslinked polymer of the present disclosure refers to a polymer not including a crosslinking agent, i.e., a polymer polymerized without a crosslinking agent.

The amount of the distilled water is not specifically limited and may be, for example, 10 to 200 parts by weight, or 20 to 100 parts by weight.

The thermoplastic resin (A) prepared as described above has an average particle diameter, for example, 150 nm to 550 nm, 200 to 450 nm, or 250 to 450 nm. Within this range, superior coloring properties, impact strength, rigidity, and surface gloss are exhibited.

Each of the emulsifier and the polymerization initiator may be, for example, one or more selected from the substances which may be used for preparation of the hard core (a).

The molecular weight regulator is used to control the molecular weight of the graft polymer. Examples of the molecular weight regulator are not specifically limited, and, for example, tertiary dodecyl mercaptan is preferred.

The prepared thermoplastic resin (A) latex may be agglomerated with sulfuric acid, $MgSO_4$, $CaCl_2$, $Al_2(SO_4)_3$, or the like as a generally known coagulant. Preferably, $CaCl_2$ is used. In particular, thermoplastic resin powder particles may be obtained by agglomerating the prepared thermoplastic resin (A) latex using an aqueous calcium chloride solution at atmospheric pressure, followed by washing, dehydration, and drying.

As the aromatic vinyl compound, for example, styrene or a derivative thereof is preferred. Particularly, styrene, α-methylstyrene, p-methylstyrene, vinyl toluene, or the like is preferred.

As the vinyl cyanide compound, for example, acrylonitrile, methacrylonitrile, or the like is preferred.

For example, the amount of a monomer constituting the non-crosslinked hard shell (c) is preferably 30 to 50 parts by weight or 35 to 45 parts by weight based on 100 parts by weight of a total of monomers used for preparation of the thermoplastic resin (A). Within this range, superior coloring properties and impact strength are provided.

The thermoplastic resin (A) of the present disclosure may have a total solid weight fraction of, for example, 40 to 60%, or 45 to 55%. Within this range, latex exhibits superior stability, whereby productivity per batch may be maximized.

In the present disclosure, the total solid weight fraction may be measured by drying about 2 g of obtained latex in a 150° C. convection oven for 10 minutes such that water and unreacted monomers are volatilized, and calculating a mass fraction of a remaining solid with respect to initial latex mass.

Preparation of Hard Thermoplastic Resin (B)

The hard thermoplastic resin (B) of the present disclosure may be, for example, a copolymer prepared by copolymerizing 20 to 75% by weight of an alkyl (meth)acrylate compound, 20 to 80% by weight of an aromatic vinyl compound, and 0 to 20% by weight of a vinyl cyanide compound. Within this range, mechanical properties, such as coloring properties and impact strength, are superior.

In another embodiment, the hard thermoplastic resin (B) of the present disclosure may be a copolymer prepared by copolymerizing 20 to 60% by weight of an alkyl (meth)acrylate compound, 20 to 60% by weight of an aromatic vinyl compound, and 5 to 20% by weight of a vinyl cyanide compound. Within this range, mechanical properties, such as coloring properties and impact strength, are superior.

In another embodiment, the hard thermoplastic resin (B) of the present disclosure may be a copolymer prepared by copolymerizing 30 to 60% by weight of an alkyl (meth) acrylate compound, 25 to 55% by weight of an aromatic vinyl compound, and 5 to 15% by weight of a vinyl cyanide compound. Within this range, mechanical properties, such as coloring properties and impact strength, are superior.

To produce a weather-resistant styrene-based resin (e.g., ASA resin) having high light transmittance, the refractive index of the hard thermoplastic resin (B) forming a continuous phase in a final product should be within a specific range. Accordingly, the refractive index of the hard thermoplastic resin (B) is preferably 1.52 to 1.56, or 1.520 to 1.560. Within this range, excellent light transmittance is exhibited, whereby coloring properties of a final resin composition are greatly improved.

The hard thermoplastic resin (B) may be, for example, a hard polymer having a glass transition temperature of 60 to 140° C., or 80 to 130° C. Here, the glass transition temperature may be measured using a DSC.

The alkyl (meth)acrylate compound may be, for example, one or more selected from the group consisting of methyl methacrylate, ethyl methacrylate, propyl methacrylate, butyl methacrylate, ethylhexyl methacrylate, decyl methacrylate, methylacrylate, ethyl acrylate, propyl acrylate, butyl acrylate, and ethylhexyl acrylate.

The aromatic vinyl compound may be, for example, one or more selected from the group consisting of styrene, α-methylstyrene, o-ethylstyrene, p-ethylstyrene, and vinyl toluene.

The vinyl cyanide compound may be, for example, one or more selected from the group consisting of acrylonitrile, methacrylonitrile, and ethacrylonitrile.

The weight average molecular weight of the hard thermoplastic resin (B) of the present disclosure may be, for example, 50,000 to 500,000 g/mol, 50,000 to 200,000 g/mol, 80,000 to 150,000 g/mol, or 90,000 to 120,000 g/mol. Within this range, both fluidity and impact strength are superior.

In the present disclosure, the weight average molecular weight may be measured by a Gel Permeation Chromatography (GPC) method.

Polymerization of the hard thermoplastic resin (B) of the present disclosure is not specifically limited and, as a particular example, suspension polymerization, bulk polymerization, or continuous bulk polymerization may be used.

The thermoplastic resin of the present disclosure(B) may be, for example, a polymer, during polymerization of which an antioxidant is included. For example, the antioxidant may be added in an amount of 0.05 to 1 part by weight, or 0.05 to 0.5 parts by weight based on 100 parts by weight of a total of monomers used for preparation of the thermoplastic resin (B).

The hard thermoplastic resin (B) may be prepared, for example, by a continuous process using a preparation apparatus that includes a raw material feed pump, a continuous stirring tank, a preheating tank, a volatilization tank, a copolymer transfer pump, and an extruder.

<Thermoplastic Resin Composition>

The thermoplastic resin of the present disclosure composition may include 20 to 80 parts by weight of the thermoplastic resin (A) and 80 to 20 parts by weight of the hard thermoplastic resin (B) which are prepared as described above.

The thermoplastic resin (A) may be included in an amount of, for example, 30 to 60 parts by weight, 30 to 50 parts by weight, or 35 to 45 parts by weight, and the hard thermoplastic resin (B) may be included in an amount of, for example, 40 to 70 parts by weight, 50 to 70 parts by weight, or 55 to 75 parts by weight. Within these ranges, superior coloring properties and impact strength are provided.

The thermoplastic resin of the present disclosure composition may further include, for example, one or more selected from the group consisting of a lubricant, an antioxidant, a UV stabilizer and a pigment. Here, the lubricant, the antioxidant, the UV stabilizer, and the pigment may be respectively included in an amount of 0.1 to 5 parts by weight, or 0.2 to 2 parts by weight.

The thermoplastic resin of the present disclosure composition may have, for example, an impact strength of 15 kg·cm/cm or more, or 15 to 25 kg·cm/cm, and a tensile strength of 400 kg/cm$^2$ or more, or 400 to 450 kg/cm$^2$.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLES

In the following examples, the average particle diameter of latex was measured using an intensity Gaussian distribution (Nicomp 370HPL) according to a dynamic laser light scattering method.

Example 1

<Preparation of Thermoplastic Resin (A)>
Preparation of Hard Core (a)

15 parts by weight of styrene, 5 parts by weight of acrylonitrile, 0.2 parts by weight of di-2-ethyl hexyl sulfosuccinate sodium salt, 0.04 parts by weight of ethylene glycol dimethacrylate, 0.04 parts by weight of allyl methacrylate, 0.2 parts by weight of sodium bicarbonate, and 40 parts by weight of distilled water were fed into a reactor batchwise and temperature was elevated up to 70° C. Subsequently, 0.05 parts by weight of potassium persulfate was added thereto to initiate polymerization. This polymerization was carried out at 70° C. for one hour. After terminating the polymerization, a polymer forming a latex-like hard core (a) was obtained. The obtained polymer had an average particle diameter of 170 nm and a refractive index of 1.573.

Preparation of Crosslinked Rubber Layer (b)

A mixture including 40 parts by weight of butyl acrylate, 0.5 parts by weight of sodium di-2-ethyl hexyl sulfosuccinate sodium salt, 0.2 parts by weight of ethylene glycol dimethacrylate, 0.2 parts by weight of allyl methacrylate, 0.1 parts by weight of sodium bicarbonate, 20 parts by weight of distilled water, and 0.05 parts by weight of potassium persulfate was continuously added to the prepared hard core (a) latex over three hours at 70° C. After terminating the addition, polymerization was further performed for one hour. After polymerization, a latex-like rubber polymer having an average particle diameter of 250 nm was obtained. Here, the thickness of the crosslinked rubber layer (b) was calculated according to the following equation. As a result, the thickness of the prepared crosslinked rubber layer (b) was 40 nm.

(Thickness of crosslinked rubber layer (b))=[(average particle diameter of rubber polymer)−(average particle diameter of hard core (a))]/2

Preparation of Non-crosslinked Hard Shell (c)

Polymerization was performed by continuously adding a mixture including 30 parts by weight of styrene, 10 parts by weight of acrylonitrile, 1.5 parts by weight of potassium rosinate, 0.1 parts by weight of potassium persulfate, 0.05 parts by weight of tertiary dodecyl mercaptan, and 50 parts by weight of distilled water to the rubber polymer latex (the hard core (a)+the crosslinked rubber layer (b)) over three hours. In addition, to increase a polymerization conversion rate, temperature was elevated to 75° C. after terminating the addition, and reaction was further performed for one hour. Subsequently, the mixture was cooled to 60° C. After terminating the reaction, a final graft copolymer, a thermoplastic resin (A) latex, was obtained. The thermoplastic resin (A) latex had an average particle diameter of 300 nm, and the weight fraction of a total of solids in the latex was 48%.

The obtained latex was subjected to atmospheric pressure agglomeration at 85° C. using an aqueous calcium chloride solution, followed by aging at 95° C., dehydrated, and washed. Subsequently, drying was performed for 30 minutes using 90° C. hot air. As a result, thermoplastic resin powder particles were obtained.

Preparation of Hard Thermoplastic Resin (B)

A polymerization solution was prepared by adding 1,1-bis(t-butylperoxy)-3,3,5-trimethyl cyclohexane 0.02 parts by weight, n-dodecyl mercaptan 0.08 parts by weight, and 0.1 parts by weight of Irgacure (1,3,5-tris(4-tert-butyl-3-hydroxy-2,6-dimethylbenzyl)-1,3,5-triazine-2,4,6-(1H,3H,5H)-trione), as a hindered phenolic antioxidant, to a mixture including 20 parts by weight of toluene, 40 parts by weight of styrene, 30 parts by weight of methyl methacrylate, and 10 parts by weight of acrylonitrile. Polymerization was carried out in a first reactor at a 140° C. while feeding the prepared polymerization solution into a 26 reactor at a rate of 14 L/hr. Polymerization in a second reactor was carried out at 150° C., and, when a polymerization conversion rate was about 60% or more, unreacted monomers and a reaction medium were removed at 215° C. from a volatilization tank. As a result, a pellet-type copolymer resin was prepared. The prepared hard thermoplastic resin (B) had a weight average molecular weight of 100,000 g/mol and a refractive index of 1.541.

Preparation of Thermoplastic Resin Composition 1 part by weight of a lubricant, 0.5 parts by weight of an antioxidant, and 0.5 parts by weight of a UV stabilizer were added to and mixed with 40 parts by weight of the obtained thermoplastic resin (A) powder and 60 parts by weight of the prepared hard thermoplastic resin (B). A resultant mixture was prepared in pellet form by means of a 40π extrusion kneader at a cylinder temperature of 220° C. The prepared pellets were injected and prepared into a specimen for property measurement and a specimen with a thickness of 3.2 mm for measuring surface gloss and light transmittance.

Example 2

An experiment was carried out in the same manner as in Example 1, except that 15 parts by weight of styrene, 5 parts by weight of acrylonitrile, and 0.15 parts by weight of di-2-ethyl hexyl sulfosuccinate sodium salt were used instead of 15 parts by weight of styrene, 5 parts by weight of acrylonitrile, and 0.2 parts by weight of di-2-ethyl hexyl sulfosuccinate sodium salt to prepare a hard core (a) and 26.2 parts by weight of styrene and 8.8 parts by weight of acrylonitrile were used instead of 30 parts by weight of styrene and 10 parts by weight of acrylonitrile to prepare a non-crosslinked hard shell (c). Here, the refractive index of a hard core (a) latex was 1.574 and the average particle diameter thereof was 260 nm. The average particle diameter of a rubber polymer latex (the hard core (a)+a crosslinked rubber layer (b)) was 360 nm, and the thickness of the rubber layer (b) was 50 nm.

The average particle diameter of finally obtained thermoplastic resin (A) latex was 420 nm.

Example 3

An experiment was carried out in the same manner as in Example 2, except that 0.1 parts by weight of di-2-ethyl hexyl sulfosuccinate sodium salt was used instead of 0.2 parts by weight of di-2-ethyl hexyl sulfosuccinate sodium salt to prepare a hard core (a). Here, the refractive index of a core (a) latex was 1.574, and the average particle diameter thereof was 190 nm. The average particle diameter of rubber polymer latex (the hard core (a)+a crosslinked rubber layer (b)) was 260 nm, and the thickness of the rubber layer (b) was 35 nm. The average particle diameter of finally obtained thermoplastic resin (A) latex was 310 nm.

Example 4

An experiment was carried out in the same manner as in Example 1, except that 12 parts by weight of styrene, 8 parts by weight of methyl methacrylate, and 0.15 parts by weight of di-2-ethyl hexyl sulfosuccinate sodium salt were used instead of 15 parts by weight of styrene, 5 parts by weight of acrylonitrile and 0.2 parts by weight of di-2-ethyl hexyl sulfosuccinate sodium salt.

Here, the refractive index of a hard core (a) latex was 1.55 and the average particle diameter thereof was 190 nm. The average particle diameter of a rubber polymer latex (the hard core (a)+a crosslinked rubber layer (b)) was 270 nm, and the thickness of the rubber layer (b) was 40 nm. The average particle diameter of finally obtained thermoplastic resin (A) latex was 330 nm.

Example 5

A thermoplastic resin (A) was prepared in the same manner as in Example 1, except that 0.15 parts by weight of di-2-ethyl hexyl sulfosuccinate sodium salt were used instead of 0.2 parts by weight of di-2-ethyl hexyl sulfosuccinate sodium salt to prepare a hard core (a), 50 parts by weight of butyl acrylate were used instead of 40 parts by weight of butyl acrylate to prepare a crosslinked a rubber layer (b), and 22.5 parts by weight of styrene and 7.5 parts by weight of acrylonitrile were used instead of 30 parts by weight of styrene and 10 parts by weight of acrylonitrile to prepare a non-crosslinked hard shell (c). Here, the refractive index of a hard core (a) latex was 1.572, and an average particle diameter thereof was 220 nm. The average particle diameter of a rubber polymer latex (the hard core (a)+the crosslinked rubber layer (b)) was 340 nm, and the thickness of the rubber layer (b) was 60 nm. The average particle diameter of finally obtained graft copolymer (A) latex was 380 nm.

1 part by weight of a lubricant, 0.5 parts by weight of an antioxidant, and 0.5 parts by weight of a UV stabilizer were added to and mixed with 36 parts by weight of the obtained thermoplastic resin (A) powder particles and 64 parts by weight of the hard thermoplastic resin (B) prepared in the same manner as in Example 1. A resultant mixture was prepared in pellet form by means of a 40π extrusion kneader at a cylinder temperature of 220° C. The prepared pellets were injected and prepared into a specimen for property measurement and a specimen with a thickness of 3.2 mm for measuring surface gloss and light transmittance.

Example 6

An experiment was carried out in the same manner as in Example 1, except that 25 parts by weight of styrene, 47 parts by weight of methyl methacrylate and 8 parts by weight of acrylonitrile were used instead of 40 parts by weight of styrene, 30 parts by weight of methyl methacrylate, and 10 parts by weight of acrylonitrile to prepare a hard thermoplastic resin (B). As a result, an obtained hard thermoplastic resin (B) had a weight average molecular weight of 110,000 g/mol and a refractive index of 1.525.

Example 7

An experiment was carried out in the same manner as in Example 1, except that 50 parts by weight of styrene, 20 parts by weight of methyl methacrylate, and 10 parts by weight of acrylonitrile were used instead of 40 parts by weight of styrene, 30 parts by weight of methyl methacrylate, and 10 parts by weight of acrylonitrile to prepare a hard thermoplastic resin (B). As a result, an obtained hard thermoplastic resin (B) had a weight average molecular weight of 95,000 g/mol and a refractive index of 1.555.

Comparative Example 1

An experiment was carried out in the same manner as in Example 1, except that 10 parts by weight of butylacrylate and 0.15 parts by weight of di-2-ethyl hexyl sulfosuccinate sodium salt were used instead of 15 parts by weight of styrene, 5 parts by weight of acrylonitrile, and 0.2 parts by weight of di-2-ethyl hexyl sulfosuccinate sodium salt to prepare a core (a), 30 parts by weight of butylacrylate were used instead of 40 parts by weight of butylacrylate to prepare a crosslinked rubber layer (b), and 45 parts by weight of styrene, 15 parts by weight of acrylonitrile, and 0.08 parts by weight of tertiary dodecyl mercaptan were used instead of 30 parts by weight of styrene, 10 parts by weight of acrylonitrile, and 0.05 parts by weight of tertiary dodecyl mercaptan to prepare a non-crosslinked hard shell (c). Here, the refractive index of a hard core (a) latex was 1.473, and the average particle diameter thereof was 180 nm. The average particle diameter of rubber polymer latex (the hard core (a)+the crosslinked rubber layer (b)) was 290 nm, and the average particle diameter of finally obtained graft copolymer (A) latex was 400 nm. Here, since the compositions of the hard core (a) and the crosslinked rubber layer (b) were the same as those of a butyl acrylate polymer, a rubber layer (b) having a different refractive index was not generated.

Comparative Example 2

An experiment was carried out in the same manner as in Example 1, except that 4 parts by weight of styrene, 16 parts by weight of methylmethacrylate, and 0.15 parts by weight of di-2-ethyl hexyl sulfosuccinate sodium salt were used instead of 15 parts by weight of styrene, 5 parts by weight of acrylonitrile, and 0.2 parts by weight of di-2-ethyl hexyl sulfosuccinate sodium salt to prepare a hard core (a).

Here, the refractive index of the hard core (a) latex was 1.510, and the average particle diameter thereof was 180 nm. The average particle diameter of rubber polymer latex (the hard core (a)+a crosslinked rubber layer (b)) was 260 nm, and the thickness of the rubber layer (b) was 40 nm. The average particle diameter of finally obtained thermoplastic resin (A) latex was 310 nm.

Comparative Example 3

1 part by weight of a lubricant, 0.5 parts by weight of an antioxidant, and 0.5 parts by weight of a UV stabilizer were added to and mixed with 40 parts by weight of thermoplastic resin (A) powder particles obtained according to Comparative Example 2 and 60 parts by weight of a hard thermoplastic resin (B) obtained according to Example 6. A resultant mixture was prepared in pellet form by means of a 40π extrusion kneader at a cylinder temperature of 220° C. The prepared pellets were injected and prepared into a specimen for property measurement and a specimen with a thickness of 3.2 mm for measuring surface gloss and light transmittance.

Comparative Example 4

A thermoplastic resin (A) powder was obtained in the same manner as in Example 1, except that 5 parts by weight of styrene, 1 part by weight of acrylonitrile, and 0.06 parts by weight of di-2-ethyl hexyl sulfosuccinate sodium salt were used instead of 15 parts by weight of styrene, 5 parts by weight of acrylonitrile, and 0.2 parts by weight of di-2-ethyl hexyl sulfosuccinate sodium salt to prepare a core (a), and 54 parts by weight of butyl acrylate were used instead of 40 parts by weight of butylacrylate to prepare a crosslinked rubber layer (b). Here, the refractive index of a hard core (a) latex was 1.571, and the average particle diameter thereof was 170 nm. The average particle diameter of rubber polymer latex (the hard core (a)+the crosslinked rubber layer (b)) was 360 nm, and the thickness of the crosslinked rubber layer (b) was 95 nm. The average particle diameter of finally obtained thermoplastic resin (A) latex was 430 nm.

1 part by weight of a lubricant, 0.5 parts by weight of an antioxidant, and 0.5 parts by weight of a UV stabilizer were added to and mixed with 30 parts by weight of resultant thermoplastic resin (A) powder particles and 70 parts by weight of a hard thermoplastic resin (B) obtained according to Example 1. A resultant mixture was prepared in pellet form by means of a 40π extrusion kneader at a cylinder temperature of 220° C. The prepared pellets were injected and prepared into a specimen for property measurement and a specimen with a thickness of 3.2 mm for measuring surface gloss and light transmittance.

Comparative Example 5

An experiment was carried out in the same manner as in Example 1, except that 22.5 parts by weight of styrene, 7.5 parts by weight of acrylonitrile, and 0.25 parts by weight of di-2-ethyl hexyl sulfosuccinate sodium salt were used instead of 15 parts by weight of styrene, 5 parts by weight of acrylonitrile, and 0.2 parts by weight of di-2-ethyl hexyl sulfosuccinate sodium salt to prepare a hard core (a), and 22.5 parts by weight of styrene and 7.5 parts by weight of acrylonitrile were used instead of 30 parts by weight of styrene and 10 parts by weight of acrylonitrile to prepare the non-crosslinked hard shell (c). Here, the refractive index of a hard core (a) latex was 1.572, and the average particle diameter thereof was 170 nm. The average particle diameter of a rubber polymer latex (the hard core (a)+a crosslinked rubber layer (b)) was 225 nm, and the thickness of the crosslinked rubber layer (b) was 27.5 nm. The average particle diameter of finally obtained thermoplastic resin (A) latex was 260 nm.

Comparative Example 6

An experiment was carried out in the same manner as in Example 1, except that 60 parts by weight of styrene, 0 parts by weight of methyl methacrylate, and 20 parts by weight of acrylonitrile were used instead of 40 parts by weight of styrene, 30 parts by weight of methyl methacrylate and 10 parts by weight of acrylonitrile to prepare a hard thermoplastic resin (B). As a result, an obtained hard thermoplastic resin (B) had a weight average molecular weight of 110,000 g/mol and refractive index of 1.571.

Comparative Example 7

An experiment was carried out in the same manner as in Example 1, except that 20 parts by weight of styrene and 0.3 parts by weight of di-2-ethyl hexyl sulfosuccinate sodium salt were used instead of 15 parts by weight of styrene, 5 parts by weight of acrylonitrile, and 0.2 parts by weight of di-2-ethyl hexyl sulfosuccinate sodium salt to prepare a hard core (a) and reaction was allowed at 70° C. for 2.5 hours. Here, the refractive index of a hard core (a) latex was 1.592 and the average particle diameter thereof was 200 nm. The average particle diameter of rubber polymer latex (the hard core (a)+a crosslinked rubber layer (b)) was 290 nm and the thickness of the crosslinked rubber layer (b) was 45.0 nm. The average particle diameter of finally obtained thermoplastic resin (A) latex was 380 nm.

Comparative Example 8

An experiment was carried out in the same manner as in Example 1, except that 20 parts by weight of styrene, 50 parts by weight of methyl methacrylate, and 10 parts by weight of acrylonitrile were used instead of 40 parts by weight of styrene, 30 parts by weight of methyl methacrylate and 10 parts by weight of acrylonitrile to prepare a hard thermoplastic resin (B). An obtained hard thermoplastic resin (B) has a weight average molecular weight of 105,000 g/mol and a refractive index of 1.518.

[Test Examples]

The properties of the specimens according to Examples 1 to 7 and Comparative Examples 1 to 8 were measured according to the following methods. Results are summarized in Tables 1 and 2 below.

A) Light transmittance—Measured according to ASTM D1003.

B) Gloss (at angle of 45°)—Measured according to ASTM D528.

C) Izod impact strength (¼" notched at 23° C. kg·cm/cm)—Measured according to ASTM D256.

D) Tensile strength (50 mm/min, kg/cm$^2$)—Measured under a thickness condition of ⅛" according to ASTM D638.

E) Pigment coloring properties—Value L of a specimen with a thickness of ⅛" for measuring coloring properties was measured using a color difference meter. Brightness is low with decreasing value L and thus dark black is displayed, which means superior pigment coloring properties. Here, the specimens for measuring coloring properties were manufactured using the same ingredients and contents as the specimens for measuring properties, except that 1 part by weight of carbon black was further added to the specimens for measuring coloring properties. Here, the specimens for measuring coloring properties and the specimens for measuring properties were extruded and injected by the same methods.

TABLE 1

| Classif- | Examples | | | | | | |
| ication | 1 | 2 | 3 | 4 | 5 | 6 | 7 |
| Refractive index of core (a) | 1.573 | 1.574 | 1.574 | 1.550 | 1.573 | 1.573 | 1.573 |
| Thickness of rubber layer (b) (nm) | 40 | 50 | 35 | 40 | 60 | 40 | 40 |

TABLE 1-continued

| Classification | Examples | | | | | | |
|---|---|---|---|---|---|---|---|
| | 1 | 2 | 3 | 4 | 5 | 6 | 7 |
| Refractive index of matrix (B) | 1.541 | 1.541 | 1.541 | 1.541 | 1.541 | 1.526 | 1.555 |
| Light transmittance (%) | 57 | 55 | 60 | 53 | 51 | 50 | 46 |
| Surface gloss | 99 | 98 | 99 | 98 | 96 | 99 | 99 |
| Impact strength | 19 | 21 | 16 | 17 | 20 | 17 | 20 |
| Tensile strength | 430 | 420 | 450 | 430 | 400 | 440 | 420 |
| Coloring properties (L) | 24.67 | 25.25 | 24.55 | 24.89 | 25.10 | 25.11 | 25.52 |

TABLE 2

| Classification | Comparative Examples | | | | | | | |
|---|---|---|---|---|---|---|---|---|
| | 1 | 2 | 3 | 4 | 5 | 6 | 7 | 8 |
| Refractive index of core (a) | 1.473 | 1.510 | 1.510 | 1.571 | 1.572 | 1.573 | 1.592 | 1.573 |
| Thickness of rubber layer (b) (nm) | — | 40 | 40 | 95 | 27.7 | 40 | 45 | 40 |
| Refractive index of matrix (B) | 1.541 | 1.541 | 1.525 | 1.541 | 1.541 | 1.571 | 1.541 | 1.518 |
| Light transmittance (%) | 7 | 10 | 13 | 8 | 63 | 11 | 14 | 12 |
| Surface gloss | 81 | 96 | 97 | 88 | 99 | 96 | 98 | 98 |
| Impact strength | 23 | 19 | 17 | 26 | 12 | 20 | 18 | 17 |
| Tensile strength | 360 | 410 | 430 | 370 | 460 | 410 | 410 | 400 |
| Coloring properties (L) | 27.00 | 26.54 | 26.77 | 27.01 | 24.50 | 26.50 | 25.82 | 26.01 |

As summarized in Tables 1 and 2, it can be confirmed that the thermoplastic resin compositions (Examples 1 to 7) according to the present disclosure exhibit high impact strength and tensile strength and superior coloring properties and surface gloss, whereas the thermoplastic resin compositions (Comparative Examples 1 to 6) not according to the present disclosure exhibit overall low light transmittance and poor coloring properties and surface gloss, particularly a strong, inversely proportional relationship between impact strength and coloring properties. Accordingly, it can be confirmed that impact strength clearly tends to be low when coloring properties are superior (Comparative Example 5) and coloring properties clearly tend to poor when impact strength is high (Comparative Examples 1, 2, 3, 4, and 6).

In addition, it can be confirmed that, when the refractive index of the core is outside the range of the present disclosure (Comparative Examples 7 and 8), light transmittance is greatly decreased and mechanical properties, such as impact strength and tensile strength, are also somewhat decreased.

The invention claimed is:

1. A thermoplastic resin composition, comprising:
   A) 20 to 80% by weight of a thermoplastic resin comprising a) a hard core having a refractive index of 1.530 to 1.590, b) a crosslinked rubber layer that surrounds the hard core, has an average thickness of 30 to 80 nm, and is prepared by polymerizing an alkyl (meth)acrylate compound and a crosslinking agent, and c) a non-crosslinked hard shell that surrounds the crosslinked rubber layer and is prepared by polymerizing an aromatic vinyl compound and a vinyl cyanide compound; and
   B) 20 to 80% by weight of a hard thermoplastic resin having a refractive index of 1.52 to 1.56, wherein the thermoplastic resin composition has a coloring property L of between 25.52 and 24.55, and
   wherein the hard thermoplastic resin is prepared by copolymerizing 30 to 60% by weight of an alkyl (meth) acrylate compound, 25 to 55% by weight of an aromatic vinyl compound, and 5 to 15% by weight of vinyl cyanide compound.

2. The thermoplastic resin composition according to claim 1, comprising:
   a) 5 to 40% by weight of the hard core having a refractive index of 1.530 to 1.590;
   b) 20 to 60% by weight of the crosslinked rubber layer that surrounds the hard core, has an average thickness of 30 to 80 nm, and is prepared by polymerizing an alkyl (meth)acrylate compound and a crosslinking agent; and
   c) 20 to 60% by weight of the non-crosslinked hard shell that surrounds the rubber layer and is prepared by polymerizing an aromatic vinyl compound and a vinyl cyanide compound.

3. The thermoplastic resin composition according to claim 1, wherein the hard core of a) is a crosslinked polymer having a glass transition temperature (Tg) of 20° C. or higher.

4. The thermoplastic resin composition according to claim 1, wherein the hard core of a) is a copolymer that is prepared by polymerizing an aromatic vinyl compound and a vinyl cyanide compound with a crosslinking agent, or a crosslinking agent and a grafting agent.

5. The thermoplastic resin composition according to claim 4, wherein the crosslinking agent is comprised in an amount of 0.01 to 0.5 parts by weight with respect to 100 parts by weight of total monomers used in the thermoplastic resin.

6. The thermoplastic resin composition according to claim 4, wherein the grafting agent is one or more selected from the group consisting of allyl methacrylate (AMA), triallyl isocyanurate (TAIC), triallylamine (TAA), and diallylamine (DAA).

7. The thermoplastic resin composition according to claim 4, wherein the grafting agent is comprised in an amount of 0.01 to 0.5 parts by weight with respect to 100 parts by weight of total monomers used in the thermoplastic resin.

8. The thermoplastic resin composition according to claim 1, wherein the crosslinked rubber layer of b) is a crosslinked rubber layer that is prepared by polymerizing an alkyl (meth)acrylate compound, a crosslinking agent, and a grafting agent.

9. The thermoplastic resin composition according to claim 8, wherein the grafting agent is comprised in an amount of 0.1 to 1.0 parts by weight with respect to 100 parts by weight of total monomers used in the thermoplastic resin.

10. The thermoplastic resin composition according to claim 1, wherein the crosslinked rubber layer of b) has a glass transition temperature (Tg) of −70 to −20° C.

11. The thermoplastic resin composition according to claim 1, wherein the alkyl (meth)acrylate compound of b) is one or more selected from the group consisting of methyl acrylate, ethyl acrylate, butyl acrylate, ethylhexyl acrylate, butyl methacrylate, and ethylhexyl methacrylate.

12. The thermoplastic resin composition according to claim 1, wherein the crosslinking agent of b) is one or more selected from the group consisting of ethylene glycol dimethacrylate, diethylene glycol dimethacrylate, triethylene glycol dimethacrylate, 1,3-butanediol dimethacrylate, 1,6-hexanediol dimethacrylate, neopentyl glycol dimethacrylate, trimethylol propane trimethacrylate, and trimethylol methane triacrylate.

13. The thermoplastic resin composition according to claim 1, wherein the crosslinking agent of b) is comprised in an amount of 0.1 to 1.0 parts by weight with respect to 100 parts by weight of total monomers used in the thermoplastic resin.

14. The thermoplastic resin composition according to claim 1, wherein the thermoplastic resin has an average particle diameter of 150 to 550 nm.

15. The thermoplastic resin composition according to claim 1, wherein the hard thermoplastic resin of B) has a glass transition temperature (Tg) of 60 to 140° C.

16. The thermoplastic resin composition according to claim 1, wherein the hard thermoplastic resin of B) has a weight average molecular weight of 50,000 to 500,000 g/mol.

17. The thermoplastic resin composition according to claim 1, wherein the hard thermoplastic resin of B) is a polymer that is prepared by polymerizing one or more selected from the group consisting of an aromatic vinyl compound, a vinyl cyanide compound, and an alkyl (meth) acrylate.

18. The thermoplastic resin composition according to claim 1, wherein the thermoplastic resin composition has a light transmittance of 35% or more.

19. The thermoplastic resin composition according to claim 1, wherein the thermoplastic resin composition has an Izod impact strength of between 16 and 20 (¼" notched at 23° C., kg·cm/cm), measured according to the ASTM D256 standard.

20. A method of preparing a thermoplastic resin composition, the method comprising a step of melt-kneading and extruding:
  A) 20 to 80% by weight of a thermoplastic resin comprising a) a hard core having a refractive index of 1.530 to 1.590, b) a crosslinked rubber layer that surrounds the hard core, has an average thickness of 30 to 80 nm, and is prepared by polymerizing an alkyl (meth)acrylate compound and a crosslinking agent, and c) a non-crosslinked hard shell that surrounds the rubber layer and is prepared by polymerizing an aromatic vinyl compound and a vinyl cyanide compound; and
  B) 20 to 80% by weight of a hard thermoplastic resin having a refractive index of 1.52 to 1.56, wherein the thermoplastic resin composition has a coloring property L of between 25.52 and 24.55, and
  wherein the hard thermoplastic resin is prepared by copolymerizing 30 to 60% by weight of an alkyl (meth) acrylate compound, 25 to 55% by weight of an aromatic vinyl compound, and 5 to 15% by weight of vinyl cyanide compound.

* * * * *